US007085835B2

(12) United States Patent
Bantz et al.

(10) Patent No.: US 7,085,835 B2
(45) Date of Patent: Aug. 1, 2006

(54) APPARATUS, SYSTEM AND METHOD FOR SUBSCRIPTION COMPUTING USING SPARE RESOURCES OF SUBSCRIBER COMPUTING PLATFORMS

(75) Inventors: David Frederick Bantz, Chappaqua, NY (US); Dennis Gerard Shea, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 09/851,645

(22) Filed: May 9, 2001

(65) Prior Publication Data

US 2002/0169877 A1 Nov. 14, 2002

(51) Int. Cl.
*G06F 15/173* (2006.01)
*G06F 15/167* (2006.01)

(52) U.S. Cl. .................. 709/226; 709/216; 709/218
(58) Field of Classification Search ........ 709/201–203, 709/216–219, 223–226
See application file for complete search history.

(56) References Cited

U.S. PATENT DOCUMENTS

| | | | | |
|---|---|---|---|---|
| 5,559,960 A * | 9/1996 | Lettvin | ........................ | 713/200 |
| 5,805,897 A | 9/1998 | Glowny | ....................... | 395/712 |
| 6,009,455 A * | 12/1999 | Doyle | ........................ | 709/201 |
| 6,098,091 A | 8/2000 | Kisor | .......................... | 709/202 |
| 6,144,992 A | 11/2000 | Turpin et al. | ................ | 709/208 |
| 6,438,553 B1 * | 8/2002 | Yamada | ........................ | 707/10 |
| 6,640,239 B1 * | 10/2003 | Gidwani | ...................... | 709/203 |
| 6,654,783 B1 * | 11/2003 | Hubbard | ...................... | 709/202 |
| 6,711,616 B1 * | 3/2004 | Stamm et al. | ............... | 709/226 |
| 6,728,751 B1 * | 4/2004 | Cato et al. | ................... | 709/202 |

OTHER PUBLICATIONS

Http://gnutella.wego.com/go/wego.pages.page?groupId=116705&view=page&pageId=118400, "What is Gnutella?", Apr. 17, 2001, pp. 1-4.
Ron Hipschman, http://setiathome.ssl.berkeley.edu/about_seti/about_seti_at_home_1.html, "How SETI@home works", Apr. 17, 2001, 11 pages.

* cited by examiner

*Primary Examiner*—Krisna Lim
*Assistant Examiner*—Yasin Barqadle
(74) *Attorney, Agent, or Firm*—Duke W. Yee; Louis P. Herzberg; Peter B. Manzo

(57) ABSTRACT

An apparatus, system and method for subscription computing using spare resources of subscriber computing platforms are provided. In the apparatus, system, method, computation and storage, intensive tasks of subscription computing are performed with subscriber resources in a peer-to-peer model rather than with centralized resources owned by a service provider. Resources may be allocated on unused workstations, workstations not currently in active use, or on workstations elsewhere in the enterprise or in other subscriber enterprises. Moreover, workstations in the enterprise may be equipped with extra resources for use in providing the subscription computing services of the present invention.

48 Claims, 3 Drawing Sheets

APPARATUS, SYSTEM AND METHOD FOR SUBSCRIPTION COMPUTING USING SPARE RESOURCES OF SUBSCRIBER COMPUTING PLATFORMS

BACKGROUND OF THE INVENTION

1. Technical Field

The present invention is directed to an apparatus, system and method for subscription computing using spare resources of subscriber computing platforms.

2. Description of Related Art

Information Technology (IT) outsourcing, or subscription computing, is a package of hardware, system and application software, services and support providing a complete implementation of a computing infrastructure. Personal computers, local area networks, an optional local server, a gateway, and Internet service are all examples of hardware, software and services that are provided to a subscription computing subscriber. Telephone-based support with remote-access software is often provided to subscription computing subscribers to resolve subscriber problems. In addition, anti-virus and data backup services may be offered to guard the subscriber's data. Such subscription computing services are often utilized by small businesses, for example, which are charged a monthly fee for the provided service.

With known IT outsourcing or subscription computing systems, the subscription computing services are provided centrally. That is, all subscription computing services, such as data backup, data analysis, and the like, make use of resources of the subscription service provider. Because these services are provided centrally, the central hosting cannot scale beyond a certain point because the service provider is a central point of failure in the system and is vulnerable to network outages. Therefore, it would be beneficial to have an apparatus, system and method for providing subscription computing services that overcomes the vulnerability of the centrally provided subscription computing services of the prior art.

SUMMARY OF THE INVENTION

The present invention provides an apparatus, system and method for subscription computing using spare resources of subscriber computing platforms. The present invention provides an apparatus, system, method and business model in which computation and storage intensive tasks of subscription computing are performed with subscriber resources in a peer-to-peer computation model rather than with centralized resources owned by a service provider. Resources may be allocated on unused workstations, workstations not currently in active use, e.g., a screensaver is active, on workstations elsewhere in the enterprise, servers running under capacity provided they participate in the peer computing environment, and the like. Moreover, workstations in the enterprise may be equipped with extra resources for use in providing the subscription computing services of the present invention.

With the present invention, the cost of subscription computing services provisioned by a provider is reduced because the provider no longer has to maintain the resources on which the various services are provisioned. The provider merely maintains control over the services running on subscriber equipment. An additional benefit to the subscriber is that during periods of communication outages between the subscription computing service provider and the subscriber's premises, the subscription computing services can continue to be provided because they are provisioned on the subscriber's premises. Moreover, because the services are provisioned on the subscriber's premises, security issues with regard to subscription services are not an issue. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides an apparatus, system and method for providing subscription computing services in a peer-to-peer manner using resources of subscriber computing platforms. Peer-to-peer infrastructures have been developed for use in swapping data amongst client machines, such as is used by the Gnutella software, and for distributing processing of data across a plurality of client devices, such as in the SETI@home project.

With Gnutella, for example, client devices are paired based on whether a client device contains a file desired by another client device. The first client device may then download the file directly from the second client device without having to first store data on a central site. See the description of Gnutella at http://gnutella.wego.com, which is hereby incorporated by reference.

With the SETI@home project, client devices download a client application that is used as a screensaver. When the screensaver becomes active, data is downloaded from a SETI server and analysis of the data is performed on the client computer using the client application. The results of the analysis are then uploaded to the SETI server. See the description of the SETI@home project available from http://setiathome.ssl.berkeley.edu.

The present invention builds on the peer-to-peer infrastructures provided in the Gnutella and SETI@home systems and makes use of peer-to-peer infrastructure in providing subscription computing services to subscribers using the subscriber's own computing platform resources. The subscription computing service provider of the present invention is preferably provided in a distributed data processing environment such as in a distributed network, such as the Internet. As such, a brief explanation of the distributed data processing environment and computing devices therein will be provided as a context in which the present invention operates.

Figure 1:
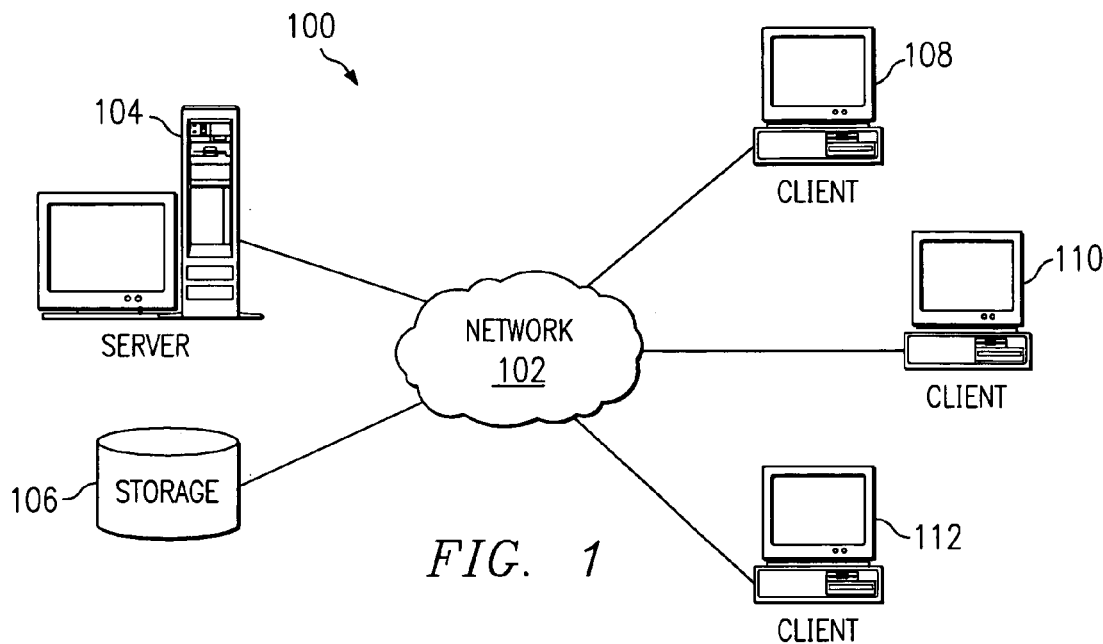
FIG. 1 is an exemplary diagram of a data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 maybe, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The client devices 108, 110 and 112, and the storage device 106 may be part of the same subscriber enterprise, e.g., a subscriber's computing system or network, or may be part of any number of different subscriber enterprises. In one particular embodiment, the present invention uses resources of client devices that are within the same subscriber enterprise, while in another embodiment the present invention can make use of resources of client devices in different subscriber enterprises, as will be described in greater detail hereafter.

The client devices 108, 110 and 112, and the storage device 106 are preferably provided with software and/or devices capable of reporting system operating information to a subscription computing service provider. The system operating information reported to the subscription computing service provider is used to control subscription computing services performed using the resources of the client devices 108, 110 and 112, and storage device 106, as will be described in greater detail hereafter.

The server 104 may be used as subscription computing service provider in accordance with the present invention. As a subscription computing service provider, the server 104 controls subscription computing services being performed using the resources of the client devices 108, 110 and 112, and storage device 106. The server 104 receives system operating information from the client devices 108, 110 and 112, and storage device 106. In addition, the server stores subscription computing information identifying the services to be provided to the subscriber. Based on the system operating information and subscription computing information, the server 104 determines which resources of which client device or storage device to allocate for use in performing a subscription computing service identified in the subscription computing information, as well as when the subscription computing service is to be performed using this resource.

With the present invention, a customer subscribes to a particular set of subscription computing services provided by a subscription computing service provider. The subscription computing services to which a customer subscribes is preferably stored in a database for use in determining what services to provide to the customer (hereafter referred to as a subscriber) at a later time. The subscription computing services may be, for example, backing up data on a subscriber computing platform, performing a computationally intensive operation, such as data mining or data analysis, or the like. The subscription computing services require computing resources in order for the services to be performed, e.g., data storage resources, processor resources, and the like.

The subscription computing service provider determines when sufficient resources are available from other subscriber computing platforms to perform these subscription computing services. In addition, the subscription computing service provider allocates these resources to perform the subscription computing services and maintains information about which resources are being utilized for which subscription computing services.

In one embodiment, a subscription computing service provider workstation is provided through which a human operator may issue commands to initiate a subscription computing service using subscriber computing platform resources. For example, the human operator may determine that it is time to backup data from client device 108. The human operator may enter a command into the subscription computing service provider workstation causing the subscription computing service provider to interrogate the other subscriber computing platforms, i.e. client devices 110, 112 and storage device 106, to determine which of the client devices 110, 112 and storage device 106 have sufficient free storage area to store the data from client device 108.

As mentioned above, the client devices 110, 112 and storage device 106 are preferably equipped with a reporting device that, upon receiving a request from the subscription computing service provider, provides system operating information of the particular client device 110, 112 and storage device 106 with which they are associated. The system operating information may include, for example, an amount of free data storage area, an amount of CPU usage, and the like. The Windows 2000 operating system (and other versions of Windows) supports an interface called the Windows Management Interface (WMI) from which the system operating information may be obtained, for example.

This system operating information is received by the subscription computing service provider and analyzed to determine which of the client devices 110, 112 and storage device 106 have sufficient resources to handle the subscription computing service. In this particular example, a determination is made as to which of the client devices 110, 112 and storage device 106 have sufficient data storage area to store the backup data from the client device 108. If, for example, client device 110 has sufficient data storage area, the subscription computing service provider may allocate enough of the free data storage area of the client device 110 for storage of the backup data from client device 108.

This allocation of free data storage area on client device 110 may be performed in a transparent manner with respect to a user of the client device 110. That is, data may be read from the client device 108 and written to a hidden partition of the client device 110 that is not viewable by the user of the client device 110. This backup data is maintained in the hidden partition as long as necessary, i.e. until overwritten by newer backup data, or until the storage area reserved in the hidden partition is needed by the client device 110 itself. In the event that the client device 110 needs the storage area reserved to the hidden partition, the data stored in the hidden partition may be migrated to another client device in the subscriber's enterprise or to a storage device associated with the subscription computing services provider.

While the above example assumes that one of the client devices 110, 112 or the storage device 106 will have sufficient data storage area to store all of the backup data from the client device 108, this may not be the case. Therefore, if none of the client devices 110, 112 and storage device 106 have sufficient free data storage area for storing all of the backup data for client device 108, the backup data may be distributed across a plurality of the storage devices of the client devices 110, 112 and storage device 106. Thus, a first number of backup files may be stored on client device 110, a second number of backup files maybe stored on client device 112, and a third number of backup files may be stored on storage device 106 in hidden partitions, for example.

The subscription computing services provider maintains information for identifying which resources have been allocated for which subscription computing services. Thus, for example, the subscription computing services provider will maintain information identifying what data was backed-up to which partition of which client device 110, 112 or storage device 106. For example, the subscription computing services provider may maintain a record in storage indicating that files 1–100 were backed-up to client device 110 at partition H, addresses locations 1–100 on Feb. 16, 2001. This information is preferably updated as it changes due to the performance of other subscription computing services, e.g., a subsequent backup of the data files.

In addition to data storage services, the subscription computing services provider may provide processor based subscription computing services, such as data analysis, data mining, running of applications, and the like. With processor based subscription computing services, like with the data storage and backup example provided above, a request may be sent from the subscription computing services provider to the client devices 108, 110 and 112, for system operating information. The system operating information may identify whether one or more processors associated with the client devices 108, 110 and 112 is being underutilized, i.e. has spare computation cycles. If it is determined that the client device 108, for example, has spare computation cycles, the subscription computing services provider may instruct the client device 108 to perform a computation in support of a subscription computing service. For example, the subscription computing services provider may instruct the client device 108 to analyze a particular chunk of data and return a result.

In an alternative embodiment, rather than requiring a human operator to initiate the performance of subscription computing services, the present invention may be performed in an automatic manner. That is, the subscription computing services provider may determine that a particular subscription computing service must be performed at a particular time based on a service agreement between the subscription computing service provider and the subscriber. Based on this service agreement, the subscription computing services provider automatically issues a request to the client devices 108, 110 and 112, and storage device 106 to acquire system operating information and the operation proceeds as described above. In this way, the need for a human operator is eliminated.

Moreover, the subscription computing services provider of the present invention may constantly monitor the various client devices 108, 110, and 112, and storage device 106 to determine if resources become available that may be used by the subscription computing services provider to perform subscription computing services. By constant monitoring, what is meant is that requests are periodically broadcast to the subscriber's computing platforms and the system operating information returned is analyzed to determine if spare resources are available for use by the subscription computing services provider. In this way, subscription computing services may be performed using resources of the subscriber's computing platforms when these resources are being underutilized.

Figure 2:
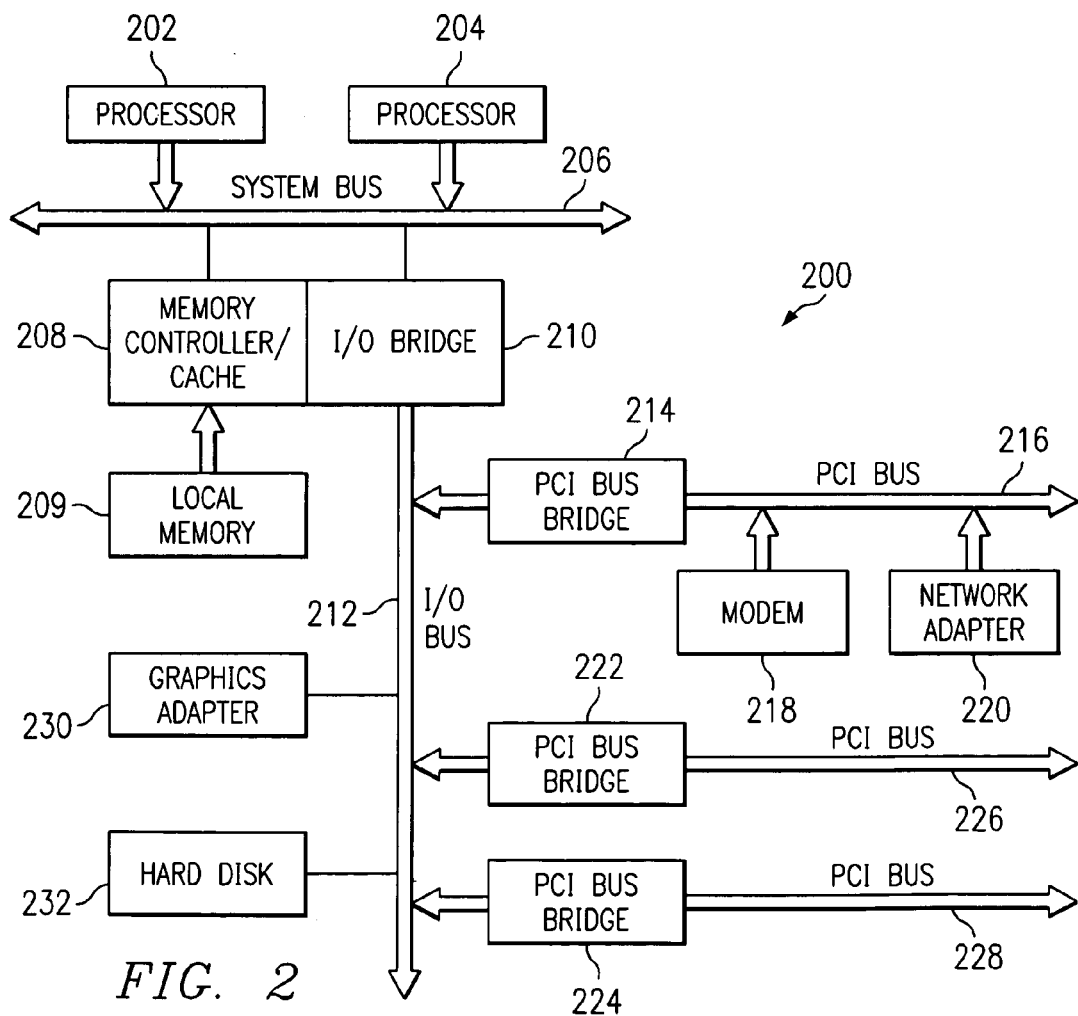
FIG. 2 is an exemplary block diagram of a server computing system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 maybe integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
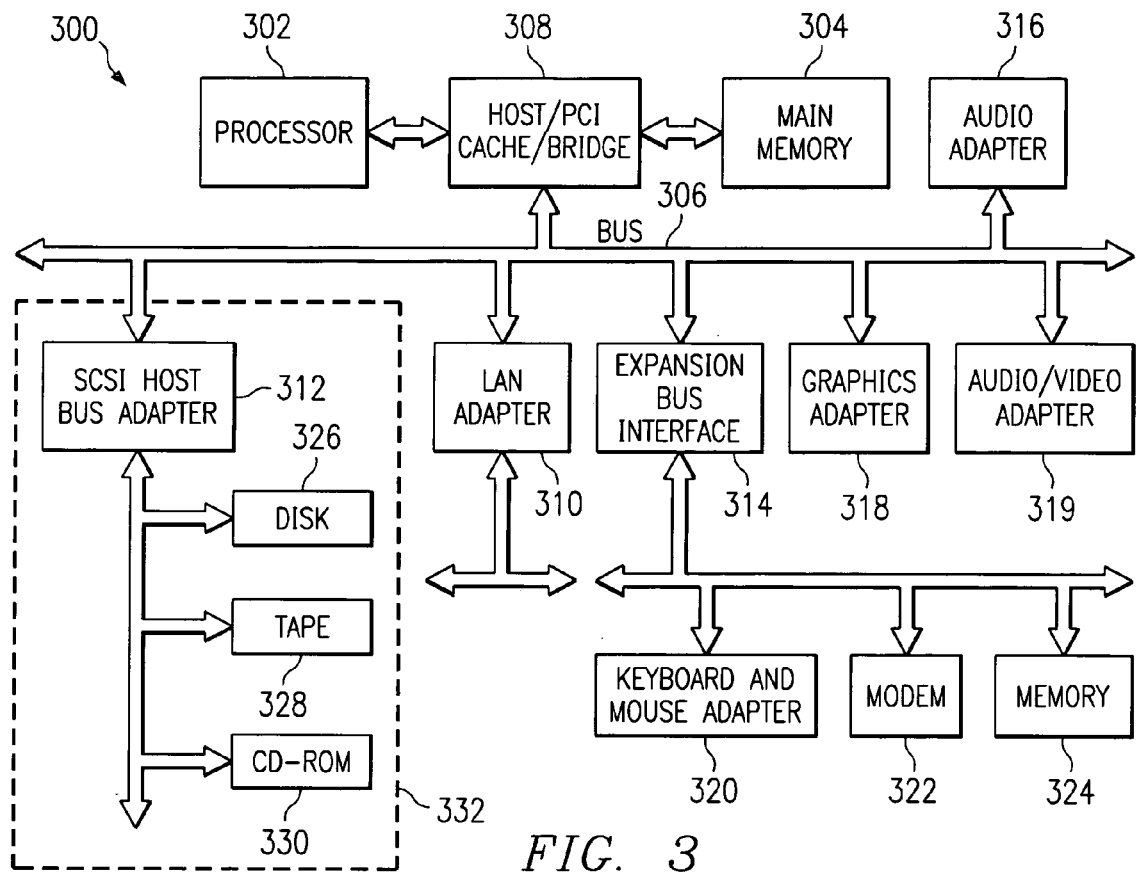
FIG. 3 is an exemplary block diagram of a client computing system in accordance with the present invention.

With reference now to FIG. 3, a block diagram illustrating a data processing system is depicted in which the present invention may be implemented. Data processing system 300 is an example of a client computer, such as client devices 108, 110 and 112 in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a subscription computing service apparatus, system and method in which the subscription computing service is performed using resources of the subscriber computing platforms in a peer-to-peer manner. Thus, the work and resources necessary to provide the subscription computing service is distributed among the computing devices and storage devices of the subscriber's system(s) and/or network. The peer-to-peer subscription computing services are controlled by a subscription computing services provider which allocates resources of the subscriber computing platforms to various subscription computing services as well as determines when to perform the subscription computing services. The allocation of resources and determination of when to perform the computing services may be based on system operating information reported back to the subscription computing services provider by the subscriber's computing platforms, for example.

Figure 4:
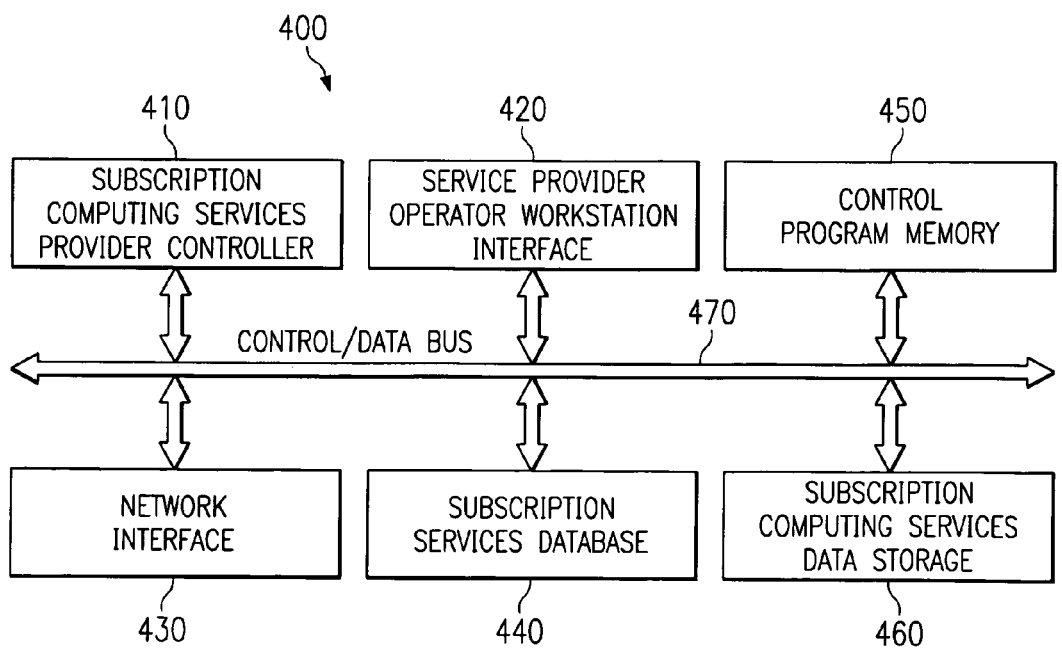
FIG. 4 is an exemplary block diagram of a subscription computing service provider according to the present invention.

FIG. 4 is an exemplary block diagram of the primary operation components of a subscription computing services provider in accordance with the present invention. The elements shown in FIG. 4 may be implemented in software, hardware, or a combination of software and hardware. In a preferred embodiment, the elements of FIG. 4 are implemented as software instructions executed in hardware elements, such as processor 202 or 204, network adapter 220, memory controller/cache 208, and the like.

As shown in FIG. 4, the subscription computing services provider 400 includes a subscription computing services provider controller 410 (hereafter the controller 410), a service provider operator workstation interface 420, a network interface 430, a subscription services database 440, a control program memory 450, and a subscription computing services data storage 460. The elements 410–460 are coupled to one another via the control/data bus 470 through which control signals and data signals may be routed to various ones of the elements 410–460. Although a bus architecture is shown in FIG. 4, the present invention is not limited to any particular architecture. Rather, any type of architecture the permits the communication of control signals and data signals to the elements 410-460 may be used without departing from the spirit and scope of the present invention.

The controller 410 controls all of the operations of the subscription computing services provider based on control programs stored in the control program memory 450. The controller 410 sends requests for system operating information to client devices of a subscriber's enterprise via the network interface 430. These requests may be sent based on an automatic operation of the controller 410 or may be based on instructions received from a human operator via the service provider operator workstation interface 420.

The controller 410 receives responses to the requests from the various client devices via the network interface 430 and analyzes the responses to determine which of the client devices have spare resources that may be used to perform subscription computing services for the subscriber. The determination of which subscription computing services are to be provided to the subscriber may be determined, for example, based on service agreement information maintained in the subscription services database 440. In addition, the subscription services database 440 may further store actual programs and/or instructions for initiating the subscription computing services on the client devices. Alternatively, these programs and/or instructions may be part of the control programs stored in the control program memory 450.

Based on the analysis of the responses received and the subscription computing services subscribed to by the subscriber, the controller 410 allocates resources on the various client devices for use in providing the subscription computing services. A record of the allocation of resources is stored in the subscription computing services data storage 460 along with any other necessary information to manage the resources used by the subscription computing services. The controller 410 then instructs the client devices to perform the desired functions of the subscription computing service, such as read data, write data, process data, and the like.

Figure 5:
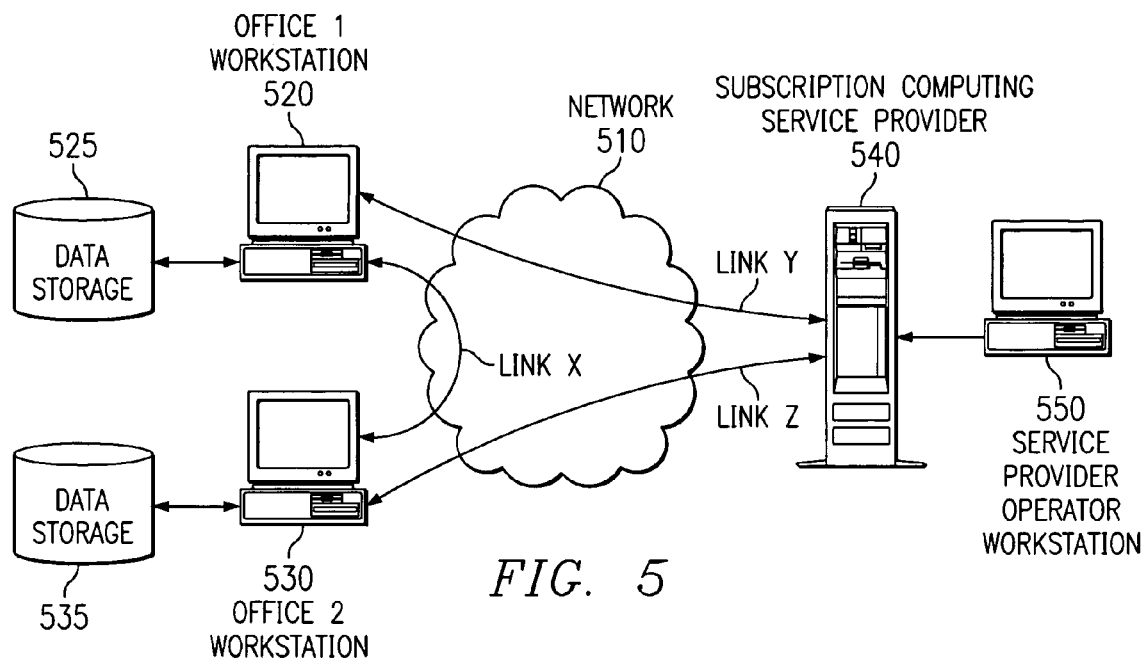
FIG. 5 is an exemplary diagram illustrating an example operation of the present invention.

FIG. 5 is an exemplary diagram illustrating an example implementation of the present invention. As shown in FIG. 5, two subscriber office workstations 520 and 530 are linked to one another and a subscription computing service provider 540 via a network 510 and links x, y and z, respectively. Link x connects subscriber office 1 workstation 520 with subscriber office 2 workstation 530, link y connects subscriber office 1 workstation 520 with subscription computing service provider 540, and link z connects subscriber office 2 workstation 530 with the subscription computing service provider 540. All of the links x, y, and z may be separate links or may be logical links sharing a common carrier, such as the Internet, for example.

Each of the subscriber office workstations 520 and 530 have associated data storage devices 525 and 535. In addition, a service provider operator workstation 550 may be provided in association with the subscription computing service provider 540. While a service provider operator workstation 550 is shown in this particular example, as mentioned above, a human operator is not necessary to the operation of the present invention and the present invention may be implemented in a fully automatic manner without departing from the spirit and scope of the present invention.

Assume that the subscription computing service that is to be provided is the backup of user data from the data storage device 525 of the subscriber office workstation 520. In one embodiment, the human operator at the service provider operator workstation 550 may initiate the backup by issuing a command via a user interface to the facilities of the subscription computing service provider 540. In an alternative embodiment, the subscription computing service provider 540 may initiate the backup service automatically.

In response to determining that a subscription computing service is to be performed on the data storage device 525 of the subscriber office workstation 520, the subscription computing service provider 540 signals over links y and z to the subscriber office workstations 520 and 530. The signals are received in peer-to-peer platform components associated with the subscriber office workstations 520 and 530 which report back to the subscription computing service provider 540 that there is sufficient disk storage space to backup the data from the data storage device 525 to the data storage device 535.

Having discovered sufficient storage space to perform the backup subscription computing service, the subscription computing service provider 540 instructs a backup service to read data from the data storage device 525 and write that data to the data storage device 535. The backup service is a script that executes a series of actions such as identifying files changed since a last backup, forming a list of these files, sequencing through the list and copying each file from its source to its destination, and marking each file as backed up. This service is normally provided on the client devices themselves but may be provided on a local or remote server. The backup data may be written to a hidden partition of the data storage device 535 that is not visible to the user of the client device 530.

Note that this distributed backup is secure because it uses facilities managed by the subscription computing service provider and within the physical control of the subscriber's enterprise. The present invention, however, is not limited to performing subscription computing services only within the subscriber's enterprise. The present invention may be used across subscriber enterprises such that, for example, data on a subscriber workstation in a first subscriber enterprise is backed up to a storage device in a second subscriber enterprise. In such a case, the data may be encrypted before it is stored or used by the subscriber workstations of the other subscriber enterprise. In this way, the security of the data may be maintained.

Figure 6:
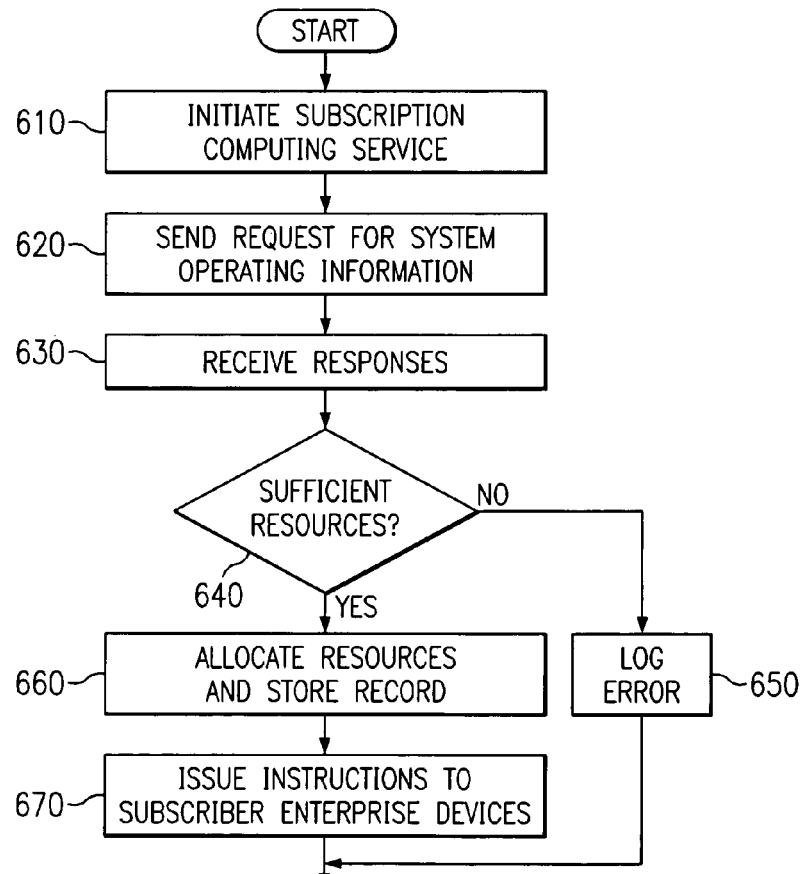
FIG. 6 is a flowchart outlining an exemplary operation of the present invention.

FIG. 6 is a flowchart outlining an exemplary operation of the present invention. As shown in FIG. 6, the operation starts with initiation of a subscription subscriber service (step 610). As mentioned above, this may be in response to a human operator instruction or an automatic determination that it is time to perform a subscription subscriber service.

A request is sent to the subscriber enterprise devices requesting system operating information (step 620). Responses are received and analyzed (step 630). A determination is made as to whether one or more of the subscriber enterprise devices, either alone or in combination, provide sufficient spare resources to perform the subscription subscriber service (step 640). If not, an error may be logged (step 650) and the operation ends.

If sufficient resources are present, the operation allocates the resources and stores a record of the allocation (step 660). Thereafter, instructions are issued to the subscriber enterprise devices instructing them to perform the necessary operations to perform the subscription computing service (step 670). The operation then ends.

Thus, the present invention provides an apparatus, system and method for providing subscription computing services using spare resources of subscriber computing devices. The present invention eliminates the need for the subscription computing services provider to maintain resources to provide the various subscription computing services and offloads this requirement by distributing the performance of the subscription computing services to the subscriber computing devices themselves. By reducing the amount of resources that must be maintained by the provider, the overall cost of the subscription computing services to the subscriber may be reduced.

While the present invention has been described in terms of using the resources of a client device to perform subscription computing services, the present invention is not limited to such. Rather, the client devices may be equipped with extra resources, or the subscriber enterprise may be equipped with extra resources, that are explicitly used as a mechanism to provide spare resources for subscription computing services. For example, a subscriber workstation may be equipped with a spare hard drive, processor, or the like, that is used exclusively or primarily for providing subscription computing services.

In addition, while the present invention has been described in terms of providing data services (e.g., data backup) and computational services (e.g., data analysis), the present invention may be used to perform other types of subscription computing services without departing from the spirit and scope of the present invention. For example, the present invention may be used to perform business computations when subscriber resources are being underutilized. Any type of subscription computing service is intended to be within the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method of providing a subscription computing service to a subscriber computing system, comprising:
    initiating the subscription computing service based on subscription computing information, wherein subscription computing information identifies the subscription computing service to be provided to a subscriber, and wherein the subscription computing service to be provided to the subscriber is identified in a service agreement;
    determining if one or more spare resources are available to provide the subscription computing service by requesting system operation information from the subscriber computing system;
    allocating a portion of the one or more spare resources if one or more spare resources are available; and
    issuing an instruction to the subscriber computing system to perform at least one operation using the allocated portion of the one or more spare resources to thereby provide the subscription computing service based on the subscription computing information.

2. The method of claim 1, further comprising receiving a command from a human operator to initiate the subscription computing service, wherein the steps of determining, allocating and issuing are performed in response to receiving the command to initiate the subscription computing service.

3. The method of claim 1, wherein the subscription computing is maintained in a subscription service database.

4. The method of claim 1, wherein the subscriber computing system includes a plurality of subscriber computing devices, and wherein determining if one or more spare resources are available in the subscriber computing system includes requesting operating information from the plurality of subscriber computing devices.

5. The method of claim 1, wherein the one or more spare resources includes one or more storage devices, and wherein the at least one operation includes writing data to at least one hidden partition of the one or more storage devices.

6. The method of claim 1, further comprising storing information identifying the allocation of the portion of the one or more spare resources and the at least one operation.

7. The method of claim 1, wherein the one or more spare resources includes at least one of spare data storage and spare computation cycles.

8. The method of claim 1, wherein the subscriber computing system includes a plurality of subscriber computing devices and wherein the subscription computing service is data backup from a first subscriber computing device of the plurality of subscriber computing devices to a second subscriber computing device of the plurality of subscriber computing devices.

9. The method of claim 1, wherein the at least one operation includes reading data from a computing system of another subscriber and writing the data to the portion of the one or more spare resources.

10. The method of claim 9, wherein the at least one operation further includes encrypting the data prior to writing the data to the portion of the one or more spare resources.

11. The method of claim 1, wherein the at least one operation includes sending work from a computing system of another subscriber to the one or more spare resources.

12. The method of claim 1, wherein the subscriber computing system includes a first subscriber computing system and a second subscriber computing system, wherein the first subscriber computing system is operated by a first subscriber and the second computing system is operated by a second subscriber different from the first subscriber, and wherein the subscription computing service includes at least one of backing up data from the first subscriber computing system to one or more spare resources of the second subscriber computing system and sending work from the first subscriber computing system to one or more spare resources of the second subscriber computing system.

13. A method of providing a subscription computing service to a subscriber computing system, comprising:
    initiating the subscription computing service based on subscription computing information, wherein subscription computing information identifies the subscription computing service to be provided to a subscriber, and wherein the subscription computing service to be provided to the subscriber is identified in service agreement;
    determining if a resource of a subscriber computing device is underutilized by requesting system operation information from the subscriber computing system; and
    issuing an instruction to the subscriber computing device to perform at least one subscription computing service operation using the resource if the resource is determined to be underutilized, to thereby provide the subscription computing service based on the subscription computing information.

14. The method of claim 13, further comprising receiving a command from a human operator to initiate the subscription computing service, wherein the steps of determining and issuing are performed in response to receiving the command to initiate the subscription computing service.

15. The method of claim 13, wherein the subscription computing information is maintained in a subscription service database.

16. The method of claim 13, wherein the subscriber computing system includes a plurality of subscriber computing devices, and wherein determining if a resource of a subscriber computing device in the subscriber computing system is underutilized includes requesting operating information from the plurality of subscriber computing devices.

17. The method of claim 13, wherein the resource is a storage device, and wherein the at least one subscription computing service operation includes writing data to at least one hidden partition of the storage device.

18. The method of claim 13, further comprising storing information identifying the resource and the at least one operation.

19. The method of claim 13, wherein the resource includes at least one of spare data storage and spare computation cycles.

20. The method of claim 13, wherein the subscriber computing system includes a plurality of subscriber computing devices and wherein the subscription computing service is data backup from a source subscriber computing device of the plurality of subscriber computing devices to the subscriber computing device.

21. The method of claim 13, wherein the at least one subscription computing service operation includes reading data from a computing system of another subscriber and writing the data to the portion of the one or more spare resources.

22. The method of claim 21, wherein the at least one subscription computing service operation further includes encrypting the data prior to writing the data to the portion of the one or more spare resources.

23. The method of claim 13, wherein the at least one subscription computing service operation includes sending work from a computing system of another subscriber to the subscriber computing device.

24. An apparatus for providing a subscription computing service to a subscriber computing system, comprising:
   a controller; and
   a memory coupled to the controller, wherein the controller initiates the subscription computing service based on subscription computing information, wherein subscription computing information identifies the subscription computing service to be provided to a subscriber, and wherein the subscription computing service to be provided to the subscriber is identified in a service agreement, determines if one or more spare resources are available to provide the subscription computing service by requesting system operation information from the subscriber computing system, allocates a portion of the one or more spare resources if one or more spare resources are available, and issues an instruction to the subscriber computing system to perform at least one operation using the allocated portion of the one or more spare resources, based on instructions stored in the memory, to thereby provide the subscription computing service based on the subscription computing information.

25. The apparatus of claim 24, wherein the controller receives a command from a human operator to initiate the subscription computing service, and wherein the controller determines if one or more spare resources are available, allocates a portion of the one or more spare resources, and issues an instruction to the subscriber computing system in response to receiving the command to initiate the subscription computing service.

26. The apparatus of claim 24, wherein the subscription computing information is maintained in a subscription services database.

27. The apparatus of claim 24, wherein the subscriber computing system includes a plurality of subscriber computing devices, and wherein the controller determines if one or more spare resources are available in the subscriber computing system by requesting operating information from the plurality of subscriber computing devices.

28. The apparatus of claim 24, wherein the one or more spare resources includes one or more storage devices, and wherein the at least one operation includes writing data to at least one hidden partition of the one or more storage devices.

29. The apparatus of claim 24, further comprising a storage device coupled to the controller, wherein the storage device stores information identifying the allocation of the portion of the one or more spare resources and the at least one operation.

30. The apparatus of claim 24, wherein the one or more spare resources includes at least one of spare data storage and spare computation cycles.

31. The apparatus of claim 24, wherein the subscriber computing system includes a plurality of subscriber computing devices and wherein the subscription computing service is data backup from a first subscriber computing device of the plurality of subscriber computing devices to a second subscriber computing device of the plurality of subscriber computing devices.

32. The apparatus of claim 24, wherein the at least one operation includes reading data from a computing system of another subscriber and writing the data to the portion of the one or more spare resources.

33. The method of claim 32, wherein the at least one operation further includes encrypting the data prior to writing the data to the portion of the one or more spare resources.

34. The apparatus of claim 24, wherein the at least one operation includes sending work from a computing system of another subscriber to the one or more spare resources.

35. The apparatus of claim 24, wherein the subscriber computing system includes a first subscriber computing system and a second subscriber computing system, wherein the first subscriber computing system is operated by a first subscriber and the second computing system is operated by a second subscriber different from the first subscriber, and wherein the subscription computing service includes at least one of backing up data from the first subscriber computing system to one or more spare resources of the second subscriber computing system and sending work from the first subscriber computing system to one or more spare resources of the second subscriber computing system.

36. An apparatus for providing a subscription computing service to a subscriber computing system, comprising:
   a controller; and
   a memory coupled to the controller, wherein the controller initiates the subscription computing service based on subscription computing information, wherein subscription computing information identifies the subscription computing service to be provided to a subscriber, and wherein the subscription computing service to be provided to the subscriber is identified in a service agreement, determines if a resource of a subscriber computing device is underutilized by requesting system operation information from the subscriber computing system and issues an instruction to the subscriber computing device to perform at least one subscription computing service operation using the resource if the resource is determined to be underutilized, based on instructions stored in the memory, to thereby provide the subscription computing service based an the subscription computing information.

37. The apparatus of claim 36, wherein the controller receives a command from a human operator to initiate the subscription computing service, and wherein the controller determines if a resource of a subscriber computing device in the subscriber computing system is underutilized and issues an instruction to the subscriber computing device in response to receiving the command to initiate the subscription computing service.

38. The apparatus of claim 36, wherein the subscription computing information is maintained in a subscription services database.

39. The apparatus of claim 36, wherein the subscriber computing system includes a plurality of subscriber computing devices, and wherein the controller determines if a resource of a subscriber computing device in the subscriber computing system is underutilized by requesting operating information from the plurality of subscriber computing devices.

40. The apparatus of claim 36, wherein the resource is a storage device, and wherein the at least one subscription computing service operation includes writing data to at least one hidden partition of the storage device.

41. The apparatus of claim 36, further comprising a storage device coupled to the controller, wherein the storage device stores information identifying the resource and the at least one operation.

42. The apparatus of claim 36, wherein the resource includes at least one of spare data storage and spare computation cycles.

43. The apparatus of claim 36, wherein the subscriber computing system includes a plurality of subscriber computing devices and wherein the subscription computing service is data backup from a source subscriber computing device of the plurality of subscriber computing devices to the subscriber computing device.

44. The apparatus of claim 36, wherein the at least one subscription computing service operation includes reading data from a computing system of another subscriber and writing the data to the portion of the one or more spare resources.

45. The apparatus of claim 44, wherein the at least one subscription computing service operation further includes encrypting the data prior to writing the data to the portion of the one or more spare resources.

46. The apparatus of claim 36, wherein the at least one subscription computing service operation includes sending work from a computing system of another subscriber to the subscriber computing device.

47. A computer program product in a computer readable medium for providing a subscription computing service to a subscriber computing system, comprising:
   instructions for initiating the subscription computing service based on subscription computing information, wherein subscription computing information identifies the subscription computing service to be provided to a subscriber, and wherein the subscription computing service to be provided to the subscriber is identified in a service agreement;
   instructions for determining if one or more spare resources are available to provide the subscription computing service by requesting system operation information from the subscriber computing system;
   instructions for allocating a portion of the one or more spare resources if one or more spare resources are available; and
   instructions for issuing an instruction to the subscriber computing system to perform at least one operation using the allocated portion of the one or more spare resources to thereby provide the subscription computing service based on the subscription computing information.

48. A computer program product in a computer readable medium for providing a subscription computing service to a subscriber computing system, comprising:
   instructions for initiating the subscription computing service based on subscription computing information, wherein subscription computing information identifies the subscription computing service to be provided to a subscriber, and wherein the subscription computing service to be provided to the subscriber is identified in a service agreement;
   instructions for determining if a resource of a subscriber computing device is underutilized by requesting system operation information from the subscriber computing system; and
   instructions for issuing an instruction to the subscriber computing device to perform at least one subscription computing service operation using the resource if the resource is determined to be underutilized, to thereby provide the subscription computing service based on the subscription computing information.

* * * * *

UNITED STATES PATENT AND TRADEMARK OFFICE
CERTIFICATE OF CORRECTION

PATENT NO. : 7,085,835 B2
APPLICATION NO. : 09/851645
DATED : August 1, 2006
INVENTOR(S) : Bantz et al.

It is certified that error appears in the above-identified patent and that said Letters Patent is hereby corrected as shown below:

Col. 11, line 47: after "computing" delete "is maintained in a subscription service" and insert --information is maintained in a subscription services--.

Col. 12, line 51: before "database" delete "service" and insert --services--.

Col. 14, line 15: before "of" delete "method" and insert --apparatus--.

Col. 14, the 51: after "based" delete "an" and insert --on--.

Signed and Sealed this

Twenty-sixth Day of December, 2006

JON W. DUDAS
*Director of the United States Patent and Trademark Office*